United States Patent [19]

Zins

[11] Patent Number: 5,517,390

[45] Date of Patent: May 14, 1996

[54] FIBER-OPTIC ILLUMINATED ARTIFICIAL CHRISTMAS TREE

[76] Inventor: Susan P. Zins, 156 Shabbana Dr., Park Forest, Ill. 60466

[21] Appl. No.: 266,126

[22] Filed: Jun. 27, 1994

[51] Int. Cl.[6] .............................. F21V 8/00; A47G 33/06; A47G 33/16
[52] U.S. Cl. ........................ 362/123; 362/32; 362/252; 362/806
[58] Field of Search ............................. 362/32, 123, 225, 362/253, 806, 249, 252

[56] References Cited

U.S. PATENT DOCUMENTS

| | | | |
|---|---|---|---|
| 3,465,139 | 9/1969 | Siegal | 40/431 |
| 3,532,874 | 10/1970 | Rosenast | 362/32 |
| 3,564,233 | 2/1971 | Cox et al. | 40/444 |
| 3,721,815 | 3/1973 | Wall | 362/32 |
| 4,060,722 | 11/1977 | Foley | 362/32 |
| 4,068,118 | 1/1978 | Carrington | 362/123 |
| 4,285,032 | 8/1981 | Honda et al. | 362/240 |
| 4,777,571 | 10/1988 | Morgan | 362/123 |
| 4,878,157 | 10/1989 | Koch | 362/123 |
| 5,104,608 | 4/1992 | Pickering | 362/32 |
| 5,226,709 | 7/1993 | Labranche | 362/32 |

*Primary Examiner*—Ira S. Lazarus
*Assistant Examiner*—L. Heyman
*Attorney, Agent, or Firm*—Fitch, Even, Tabin & Flannery

[57] ABSTRACT

An improved fiber-optic illuminated artificial Christmas tree, having a plurality of light sources contained in the main trunk, is provided. Each light source provides light for one or more tiers of artificial branches attached to the main trunk. Each branch contains a plurality of fiber optic strands such that the light-gathering ends are collected in a single bundle at, or close to, the end of the branch which attaches to the main trunk and the light-dispersing ends are distributed throughout the needles of the branch to form a natural and appealing lighting appearance similar to that of conventional strings of Christmas tree lights. The light sources can be removed easily for replacement of individual light bulbs as needed.

17 Claims, 3 Drawing Sheets

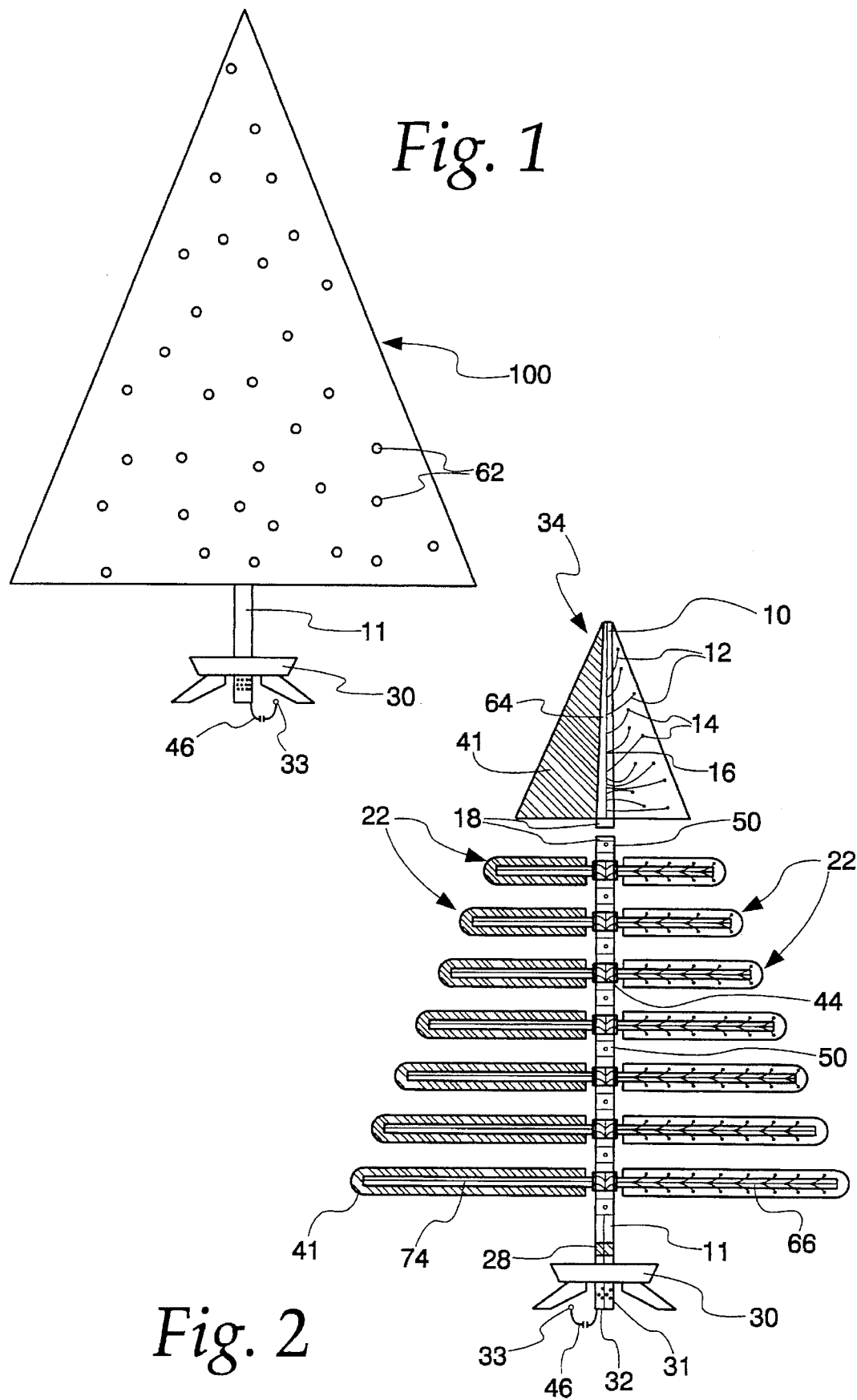

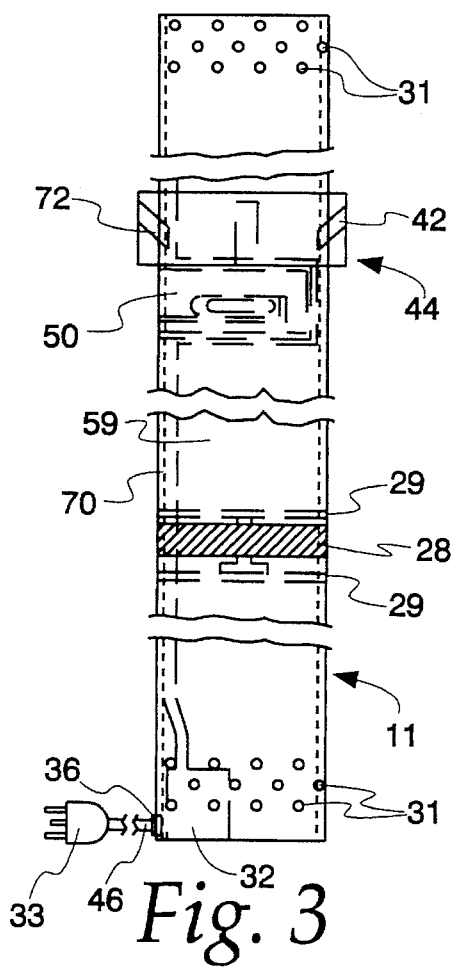
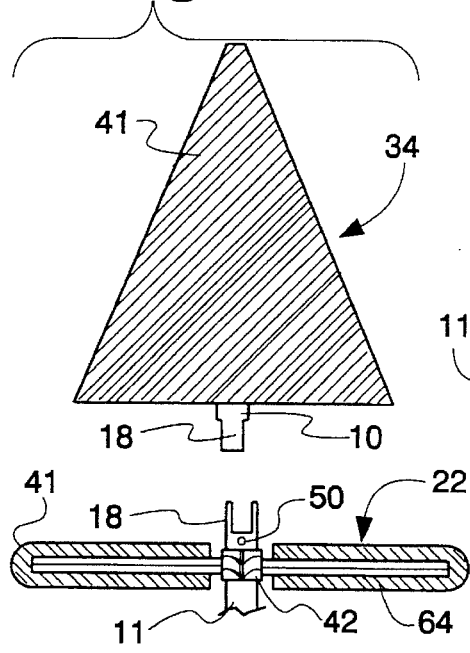
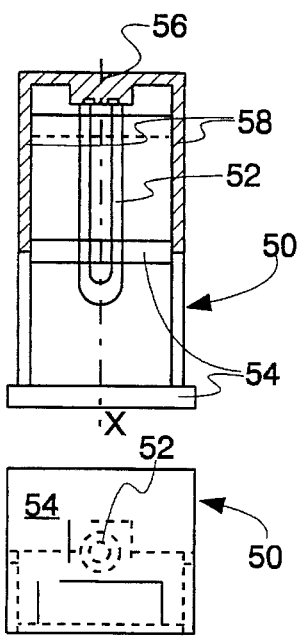
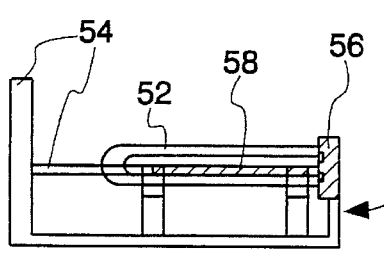
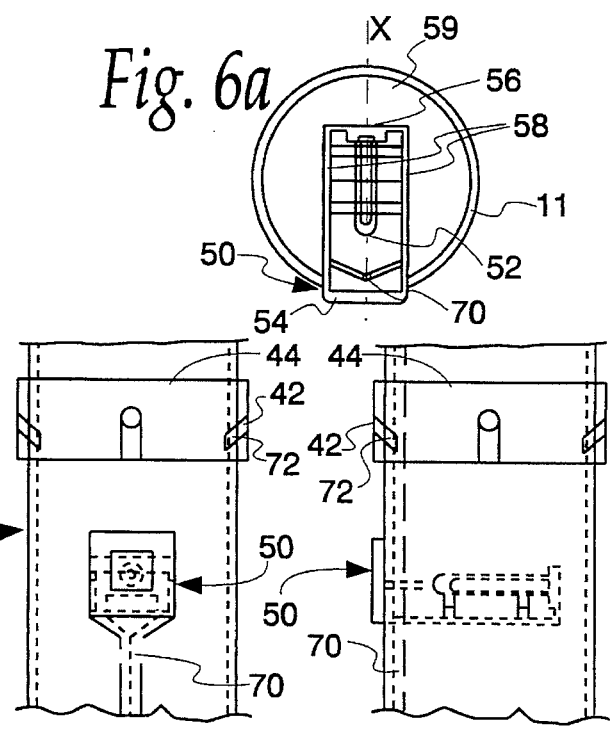

FIBER-OPTIC ILLUMINATED ARTIFICIAL CHRISTMAS TREE

FIELD OF INVENTION

This invention generally relates to artificial Christmas trees having an integral illumination or lighting system. More specifically, this invention relates to artificial Christmas trees having an improved internal fiber optics illumination system.

BACKGROUND OF THE INVENTION

Decorating for Christmas can bring great joy to some people. For others, however, it is at best a headache. Artificial Christmas trees have been developed to reduce many of the chores normally associated with natural Christmas trees, including both live and cut trees. Later, internally illuminated artificial Christmas trees were created to minimize the effort needed to display a decorated Christmas tree while also reducing the risks from fire hazards that are associated with many illuminated natural Christmas trees.

Both natural and artificial Christmas tress can be lighted with strings of incandescent lights. Integral lighting systems for artificial Christmas trees are also generally known in the art. Examples of artificial trees incorporating such lighting systems are described in Siegal, U.S. Pat. No. 3,465,139 (Sep. 2, 1969); Rosenast, U.S. Pat. No. 3,532,874 (Oct. 6, 1970); Cox et al., U.S. Pat. No. 3,564,233 (Feb. 16, 1971); Wall, U.S. Pat. No. 3,721,815 (Mar. 20, 1973); Foley, U.S. Pat. No. 4,060,722 (Nov. 29, 1977); Carrington, U.S. Pat. No. 4,068,118 (Jan. 10, 1978); Morgan, U.S. Pat. No. 4,777,571 (Oct. 11, 1988); Koch, U.S. Pat. No. 4,878,157 (Nov. 21, 1988); Pickering, U.S. Pat. No. 5,104,608 (Apr. 14, 1992); and Labranche, U.S. Pat. No. 5,226,709 (Jul. 13, 1993). These prior art systems generally suffer from one or more flaws. For example, several of these designs involve placement of illuminated clusters at the end of each branch. This approach fails to illuminate the entire tree evenly and creates a lighting display that appears remarkably different from the standard strings of Christmas lights. Most of these designs contain a single light source located in an inconvenient area of the tree and which, therefor, cannot be replaced easily. For some designs, replacement of the light source requires dismantling the entire tree. Also, if the single light source should fail, all the lights on the tree go out until the light source is replaced. The majority of the prior art systems listed above also attempt to create "twinkling" effects (thereby varying the "lighting characteristics" of the artificial tree) using rotating color wheels. In addition to being simplistic and repetitive, these effects appear extremely dissimilar to the standard types of incandescent Christmas lights typically used for tree decorations. Finally, some of these prior art systems require a large quantity of fiber optics, which makes the trees prohibitively expensive to build.

SUMMARY OF THE INVENTION

This invention relates to an artificial Christmas tree having an improved internal fiber optics illumination system. The main trunk of the present artificial Christmas tree has a plurality of light sources contained therein. Each light source provides light for one or more tiers of artificial branches attached to the main trunk. Each branch contains a plurality of fiber optic strands such that the light-gathering ends are collected in a single bundle at, or close to, the end of the branch which attaches to the main trunk and the light-dispersing ends are distributed throughout the needles of the branch to form a natural and appealing lighting appearance similar to that of conventional strings of Christmas tree lights. The light sources can be removed easily for replacement of individual light bulbs as needed.

One object of this invention is to provide an illuminated artificial Christmas tree that looks extremely similar to a natural or artificial Christmas tree adorned with strings of white or colored incandescent lights. Another object is to provide a lighting system which is safer than conventional Christmas lights in the areas of fire hazards and electrical dangers. A further object is to provide an artificial Christmas tree which is easily assembled, disassembled, and stored by the ultimate customer without any special skills or knowledge. Yet another object of the invention is to provide an artificial Christmas tree with an integral lighting system which can be manufactured at a relatively low cost.

Another object of the present invention is to provide an artificial tree incorporating an integral lighting system, said artificial tree comprising:

(1) a main trunk having a top end, a bottom end, a substantially hollow passageway extending substantially along its length, a plurality of branch-attachment openings disposed along its length, and a plurality of light-source openings along its length;

(2) a base attached to the bottom end of the main trunk to hold the main trunk in an upright position;

(3) a plurality of light sources for insertion into the light-source openings in the main trunk;

(4) a plurality of branches for attachment to the main trunk at the branch attachment openings in the main trunk, wherein each branch has a substantially hollow passageway extending at least partially along its length, needles disposed along its length, and optic-fiber openings disposed along its length, and wherein the branches form a tree-like shape when attached to the main trunk; and (5) a plurality of fiber optic strands for each branch, wherein each fiber optic strand has a light-gathering end and a light-dispersing end, wherein the light-gathering ends of the fiber optic strands for each branch are formed into a single bundle in the hollow passageway of the branch at the end of the branch which attaches to the main trunk, wherein the single bundle of light-gathering ends for each branch is illuminated with at least one of the light sources contained in the main trunk, and wherein the light-dispersing ends of the fiber optic strands for each branch pass through the optic-fiber openings and are dispersed throughout the needles of the branch.

Still another object of the present invention is to provide an artificial Christmas tree comprising a hollow main trunk having disposed therein a plurality of light sources; a plurality of branches attached to the main trunk wherein each branch has a passageway therein for passage of fiber optical strands, a plurality of outlet holes arranged along the length of the branch, and a plurality of needles attached along the length of the branch; and a plurality of fiber optical strands for each branch wherein each fiber optic strand has a light-gathering end and a light-dispersing end;

wherein, for each branch, the fiber optic strands are located within the passageway such that the light-gatherings ends of the fiber optic strands can gather light from one of the light sources in the main trunk and the light-dispersing ends of fiber optic strands extend from the passageway in the branch through the outlet holes and are dispersed throughout the needles attached to the branch.

Further objects and advantages of this invention will become apparent from a consideration of the drawings and the present specification.

DESCRIPTION OF FIGURES

FIG. 1 shows an external view of the assembled artificial tree.

FIG. 2 shows a sectional view of the assembled artificial tree.

FIG. 3 shows a partial sectional view of the main tree trunk.

FIG. 4 shows a sectional view of the secondary tree trunk and its attachment to the top of the main tree trunk.

FIGS. 5A, 5B and 5C show the orthogonal projections of an individual light source and its carriage.

FIGS. 6A, 6B and 6C show orthogonal projections of a section of the tree trunk containing a light source and its carriage.

DETAILED DESCRIPTION OF THE INVENTION

Figure 7:
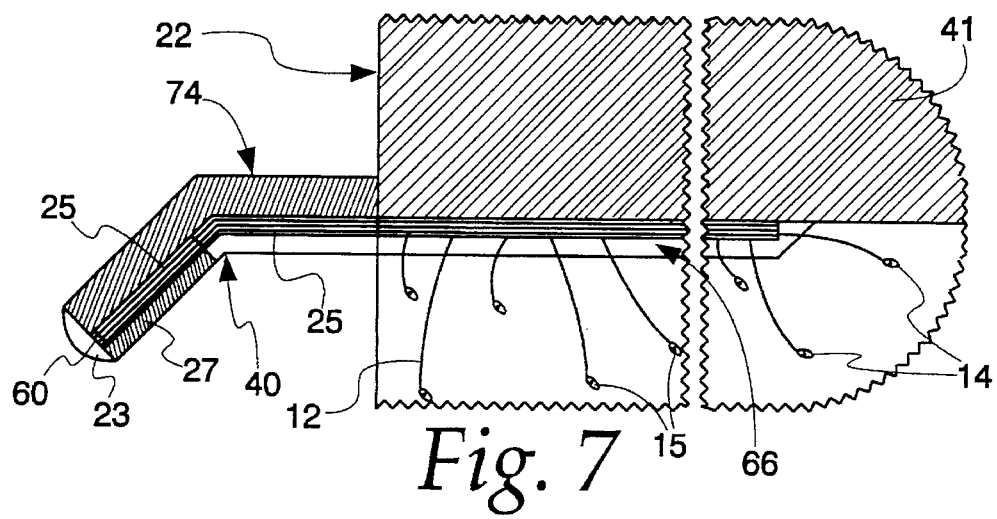
FIG. 7 shows a sectional view of a tree branch and the fiber optic strands.

The assembled Christmas tree 100 is shown in FIG. 1; a sectional view is shown in FIG. 2. In general, the tree consists of a main trunk 11 which is held upright by a tree base or stand 30, preferably a conventional three-legged tree base, a secondary tree assembly 34 which is affixed to the main trunk 11 via coupling or connector 18, and a plurality of tree branches 22. Both the secondary tree assembly 34 and the branches 22 are removable from the main trunk 11 for storage purposes. When fully assembled, the Christmas tree 100 has the general conical shape shown in FIG. 1 with lights 62 distributed in a natural and pleasing pattern. The secondary assembly 34, which forms the top of the tree, consists of the secondary trunk 10, fiber optic strands 12, and tree needles 41 (the cross-hatched portions of the secondary assembly 34 and branches 22 in FIG. 1 represent the tree needles; see also FIG. 8 for a view of individual needles). The secondary tree assembly 34, for much of its structure, is essentially equivalent to a branch 22 except that it is used to form the top of the tree (i.e., it forms the top or uppermost "branch"). Thus, much of the description of the individual branches 22 below can be applied to the secondary tree assembly 34. The branches 22 in FIG. 2 are arranged so as to form essentially a right angle with the main trunk 11. Of course, the branches 22 could be arranged at other angles to the main trunk 11; for example, the branches could be angled upward, if desired, to mimic the natural angle of real Christmas tree branches. The branches 22 in FIG. 2 are essentially linear with only a single branch-like structure. Of course, as one skilled in the art realizes, each branch 22 could also be designed using other, more tree-like structures. For example, each branch 22 could have forks and multiple limbs or other branch-like structures approximating a natural Christmas tree if desired.

Figure 8A:
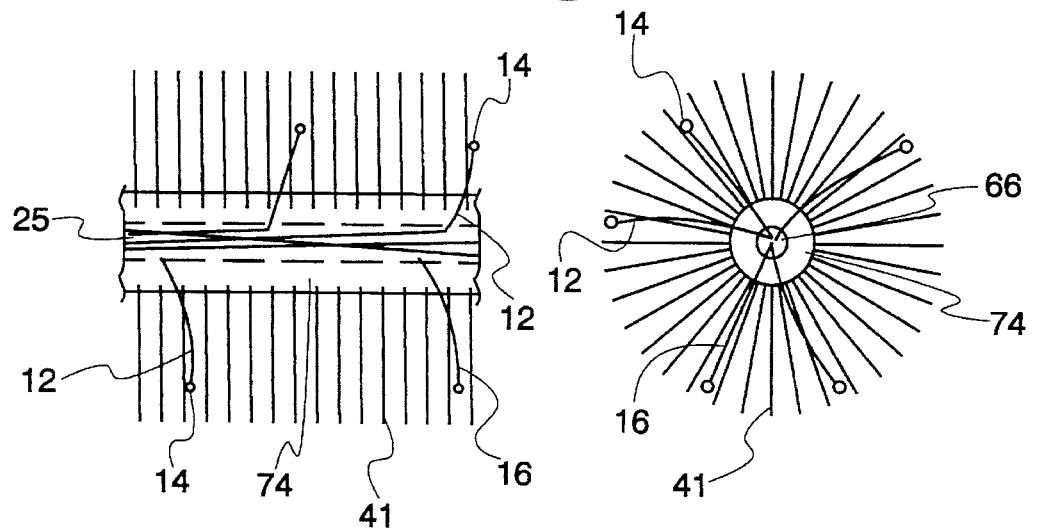
FIGS. 8A (side view) and 8B (end view) show a portion of a tree branch with its individual needles.
Figure 8B:
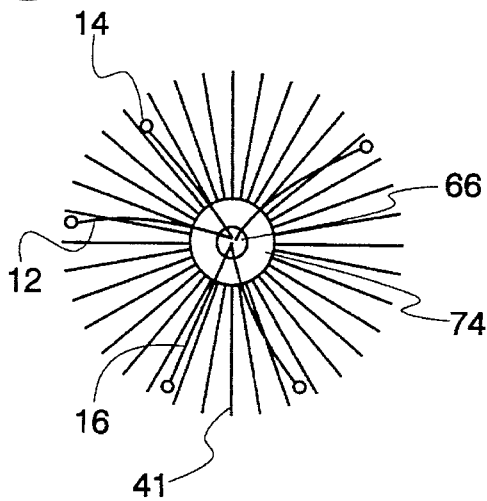

The fiber optic strands 12 run through the interior passageway 64 of the secondary trunk 10 and exit through the secondary trunk exit or outlet holes 68 to intertwine with the tree needles 41 along the exterior of the tree. Fiber optic strands 12 also run through the interior passageway 66 of the branches 22 to exit through exit or outlet holes 68 to intertwine with the tree needles 41 on the branches. The intertwining of the fiber optic strands 12 with the tree needles 41 is shown in more detail in FIG. 8. FIG. 8A shows a side view of a branch 22 with individual needles 41. FIG. 8B shows the same branch 22 in cross-sectional view with needles 41 radiating from the branch trunk 74 and fiber optic strands 12 radiating from the interior passageway 66 of the branch 22. Each fiber optic strand 12 has a light-gathering end 60 and a light-dispersing end 15.

The secondary tree assembly 34 attaches to the main trunk 11 via trunk fastener or connector 18 (see also FIG. 4). The main trunk 11 and the secondary trunk 10 are normally hollow cylinders or tapered cylinders. The inner diameter of the hollow passageway 59 of the main trunk 11 should be large enough to contain the internal light sources 50 and related electrical components as well as provide support for the entire tree. Generally, inner diameters of about 2.5 inches to 6 inches are suitable for the main trunk 11. The inner diameter of the secondary trunk 10 should be large enough to accommodate the fiber optic strands 12 used for lighting the secondary tree assembly 34. For an artificial tree which fits comfortably into a typical room with 8-foot ceilings, a main trunk height of about 45 to 60 inches and a secondary trunk height of about 20 to 30 inches are generally suitable. Shorter or taller trees can, of course, be prepared. For significantly taller artificial trees, the main trunk 11 may be formed into two or more sections if desired. For such segmented main trunks, the outlet electric supply line 70 (see FIG. 3) should be modified so it can be connected and disconnected at the junction points. The main trunk 11 preferably contains a reflective inner surface to maximize the amount of light reaching the light-gathering end 60 of each fiber optic strand 12. Such a reflective surface can be achieved by silver-colored paint, polished metal, or other means. Preferably the top of the secondary trunk 10 is closed and adapted to receive a conventional top ornament.

The base of the tree and the main trunk 11 are illustrated in more detail in FIG. 3. From the bottom of the hollow primary trunk 11, an electrical cord 46, adapted with a standard three-pronged electrical plug 33, enters the trunk 11 through an inlet hole (not shown) and is fastened in place with a rubber O-ring 36. The electric cord 46 connects to a transformer 32 which adjusts the voltage and the current to the appropriate levels needed to power the electrical components in the tree. This minimizes the dangers of electrical shocks and electrical fires. Alternatively, the transformer 32 could be located outside the trunk 11 (e.g., associated with the tree stand 30 or located remotely from the tree). Outlet electrical lines 70 from the transformer 32 supply electric power to the light sources 50 and cooling fan 28. The cooling fan 28 is attached to the trunk 11 by means of a cooling fan mount 29. The cooling fan 28 is used to cool the interior of the main trunk 11 by circulating air drawn in through cooling vents 31 located at both ends of the trunk 11. Depending on the direction of air flow from the fan 28, ambient air is pulled in through cooling vents 31 in the top or bottom of main trunk 11, passes around the plurality of light sources 50, and then out the cooling vents 31 at the bottom or top of the main trunk 11. The cooling fan 28 may operate continuously or intermittently (e.g., controlled by one or more thermostats or by a timer). The fan 28 may also be wired in series with the light sources or assemblies 50 so that if the fan 28 fails, the lights would turn off. Also, if necessary, extra cooling vents 31 can be located at additional points along the trunk 11.

FIG. 4 illustrates the connector 18 which fastens the secondary tree assembly 34 to the top of the main trunk 11. The connector 18 may be implemented as a T-lock, a threaded trunk, or another fastening method as desired.

However, it should connect the secondary assembly 34 to the main trunk 11 above the final tier of branches 22 and the final or uppermost light carriage assembly 50. Moreover, the connector 18 should not significantly reduce the light intensity from the uppermost lighting assembly 50 reaching the light-gathering ends of the fiber optic strands in the secondary tree assembly 34. The light-gathering ends of the fiber optic strands 12 in the secondary tree assembly 34 are gather into a single bundle (not shown) at the lower end of the secondary trunk 10 in essentially the same manner as described below for the branches 22.

The plurality of branches 22, preferably in the form of a plurality of tiers encircling the main trunk 11, forms a general tree-like shape, as shown in FIGS. 1 and 2. The number of branches and the number of tiers will generally be determined based on design criteria (e.g., tree height, branch and needle densities, and shape desired). Although these parameters can vary considerably, generally about 5 to 9 tiers of branches are suitable for a tree designed for a typical room with 8-foot ceilings. Each tier is illuminated by one of the plurality of light sources and carriage assemblies 50 in the main trunk 11. Preferably, each tier is illuminated by the light source located immediately below, and in close proximity to, that tier. Preferably, the number of light sources is equal to the total number of tiers plus an additional light source for illuminating the lights in the secondary tree assembly 34.

An individual light source and carriage assembly 50 is perhaps best seen in FIG. 5. FIG. 5A shows the light source and carriage assembly 50 as viewed from the top of the tree; FIG. 5B shows the assembly 50 in side view along axis x; and FIG. 5C shows assembly 50 in side view perpendicular to axis x. The assembly 50 is comprised of a carriage frame 54 which supports a light bulb 52 (preferably of the low voltage type) and a electrical socket 56 for receiving bulb 52. The light from bulb 52 reflects off of the inner surface (preferably highly reflective surfaces) of the interior passageway 59 of the main trunk 11 to increase the lighting efficiency. Preferably, bulb 52 is a low voltage halogen bulb, or other high efficiency type light bulb. Other types of bulbs can, of course, be used. The carriage assembly 50 slides in and out of the trunk 11 and is supported by the carriage frame 54. Preferably, two metal electrical prongs 58, one on each side of the carriage frame, contact the appropriate electric lines 70 from the transformer 32 once the carriage 50 is slid entirely into the trunk 11. Other methods of electrical contact with the outlet wires 70 from the transformer 32, such as the plug and socket method, may be used if desired.

A view of the light carriage assembly 50 as inserted into the main trunk 11, as well as a view of a branch support ring 44, is shown in more detail in FIG. 6. FIG. 6A shows one light source and carriage assembly 50 in the main trunk 11 as viewed from the top of the tree; FIG. 6B shows the same assembly 50 in side view along axis x; and FIG. 6C shows assembly 50 in side view perpendicular to axis x. Each light assembly 50 slides easily in and out of the trunk 11 to facilitate changing the light bulb 52 when necessary. If necessary, rails or rollers may be added to allow the light assembly 50 to slide out of the tree easier. The light assembly 50 should preferably lock in place when fully inserted into the trunk 11. When fully inserted and locked in the main trunk 11, the carriage assembly 50 preferably forms a light-tight connection with the main trunk 11 in order to prevent light from escaping from the trunk except through the fiber optic strands 12. Preferably, all the light assemblies 50 are wired in parallel so that one malfunctioning bulb 52 does not cause all of the bulbs 52 to turn off. Preferably, each light assembly 50 is located directly underneath an encircling branch support ring 44 in order to provide illumination for the branches 22 in a single tier. An additional light assembly 50 is preferably located above the top tier of branches 22 for illumination of the secondary tree assembly 34.

The branches 22 connect to the main tree trunk by sliding or being inserted into a plurality of branch support rings 44 located along the length of the main trunk. The branch support ring 44 has angled holes 42 which match the angle of the branch elbow 40 in the branches 22. The branch support rings 44 along the length of the main trunk 11 can, and preferably do, have differing numbers of holes 42 for receiving branches 22. The number of holes 42 in each branch support ring 44 should equal the number of branches 22 intended for that tier. The holes 42 may be tapered or have other mechanisms to ensure that the branch 22 stays securely in place once inserted into the branch support ring 44. The main trunk 11 has holes 72 therein which match and aline with holes 42 in the rings 44 to allow light from the main trunk 11 to be gathered and dispersed by the fiber optic strands 12 in each branch 22.

A single branch 22 is illustrated in FIG. 7. Each branch 22 effectively consists of a branch trunk 74, which contains a hollow interior or passageway 66 therein to contain the plurality of fiber optic strands 12 used to illuminate that branch, and needles 41 radiating out from the branch trunk 74 to form, preferably, a natural tree-like appearance. This hollow passageway extends to the end of the branch trunk 74 that is inserted into the main trunk 11. Inside such passageway 66, the plurality of fiber optic strands are formed into a fiber optic cluster 25 in each branch trunk 74 such that the light-gathering ends 60 are aligned and bundled together essentially at the end of the branch trunk 74 adjacent to, and insertable into, the main trunk 11. To simplify construction and to allow for easier alinement of the light-gathering ends 60 of the fiber optic strands 12, however, the hollow passageway 66 near the end of the branch can be formed in part by fiber cluster fastener 27 which attaches to the branch trunk 74 between the end of the branch and the tree branch elbow 40. Or the fiber cluster fastener 27 can be used to attach the fiber bundle 25 to the branch trunk 74. The individual fiber optic strands 12 in bundle 25 receive their illumination through the end of the branch from the light source or sources 50 contained in the main trunk 11. The branch end containing the fiber optic bundle 25 and inserted into the main trunk 11 is preferably capped with a convex lens 23 which focuses the light from within the main trunk 11 from the plurality of light sources 50 (i.e., bulbs 52) into the fiber bundles 25. The lens 23 also protects the light-gathering ends 60 of the fiber optic strands 12 to prevent scratching, chipping, and smudging. The fiber cluster fastener 27 can also be used to press and hold the light-gathering ends 60 of the fiber optic strands 12 against the lens 23. Each light-dispensing end 15 of the plurality of fiber optic strands 12 exits the branch trunk 74 through a plurality of exit or outlet holes 68 at different points along the length. The diameter of the fiber bundles 25 varies for each tier of branches, since the number of fiber optic strands 12 can differ for each tier. It is not necessary that interior passageway 66 extend to the end of the branch removed from the main trunk 11; the interior passageway 66 need only extend past the last outlet hole 68 in the branch. The inner diameter of each branch trunk 74 should be of sufficient diameter to accommodate its fiber bundle 25; this diameter may decrease as individual fiber optic strands 12 exit the branch. Generally a diameter of about ¼ to ½ inch is suitable and will provide sufficient room for the fiber bundle 25 as well as sufficient support for the branch 22. The branch 22 is laced or formed with artificial conifer-like or pine-like needles 41 in such a way as to make the branch 22 appear similar to a real tree branch (see FIG. 8). Alternatively, the needles may be designed to mimic other types of trees. The total outer diameter of each branch, including the needles, is generally about 2 to 6 inches; this diameter can, however, be larger or smaller. Moreover, the overall diameter of the branch 22 may vary from top to bottom if desired.

The number of branches per tier or layer, the lengths of the branches, and the number of lights per branch are varied for each layer to create a realistic looking tree. Generally, the branches 22 forming a single tier are the branches attached to the main trunk 11 at essentially the same height along the main trunk. Usually, the branches 22 forming a single tier will all be attached to the main trunk 11 using a single branch support ring 44. The following parameters or values are general suggestions for length and number of lights for each branch and number of branches per tier to create a realistic-looking tree for a typical room with 8-foot ceilings. For a tree with seven tiers or layers of branches, the top layer might have about 4 branches about 11" long with about 12 lights per branch; the second layer might have about 4 branches about 13" long with about 16 lights per branch; the third layer may have about 5 branches about 15" long with about 16 lights per branch; the fourth layer might have about 6 branches about 17" long with about 19 lights per branch; the fifth layer might have about 6 branches about 20" long with about 25 lights per branch; the sixth layer might have about 8 branches about 23" long with about 27 lights per branch; the seventh layer might have about 8 branches about 26" long with about 34 lights per branch. The lights should be distributed evenly along the length of each branch. The secondary tree assembly 34 might contain about 70 lights distributed evenly throughout the entire assembly 34. These parameters can, of course, vary considerably, especially if other heights, lengths, configurations, or designs are chosen for the tree.

A closer view of an individual fiber optic strand 12 exiting a branch 22 can be seen in FIG. 8. As noted above, the same basic structure is used for the fiber optic strands 12 in the secondary tree assembly 34. Each fiber optic strand 12 is threaded through outlet holes 16 or 68 in the secondary trunk 10 or branch 22, respectively. The artificial needles 41 can be attached to the branches 22 (or secondary tree assembly 34) using any conventional means. For example, the needles 41 may also be threaded through outlet holes 16 or 68. Alternatively, the needles 41 may be woven around the outside of each branch 22 or the secondary trunk 10 or formed as an integral part of each branch 22 or secondary trunk 10. For needles 41 in the secondary tree assembly 34, the length of the needles should taper along the height of the secondary trunk 10 to preserve the desired shape of the tree. The fiber optic strands 12 are generally held in place by the needles 41, but their positions could be adjusted if desired to the extent allowed by the length of the fiber optic strand 12 outside of the outlet holes 16 or 68.

Figure 9:
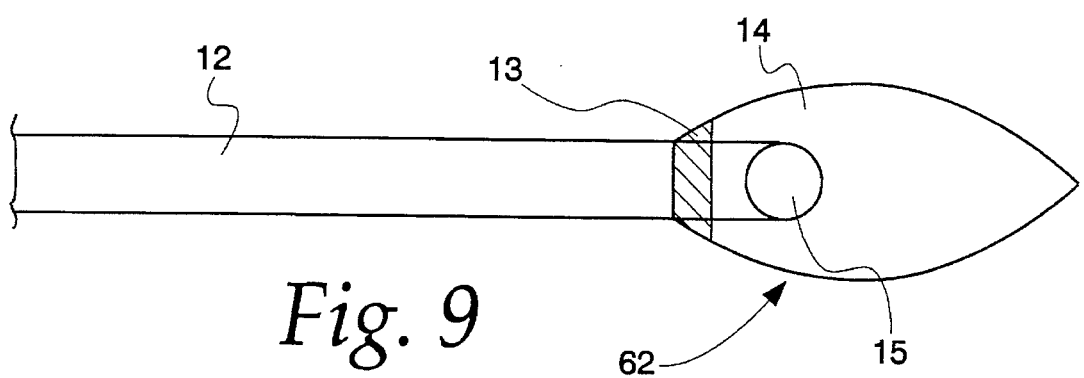
FIG. 9 shows the light-dispersing end of a fiber optic strand.

FIG. 9 illustrates a light 62 which is formed with the light-dispersing end 15 of a fiber optic strand 12 after it has emerged from branch 22 (or from secondary trunk 10). Preferably, the light-dispersing end 15 is melted into a sphere (as shown in FIG. 9) to produce a light visible from essentially all fields of view. The light-dispersing end 15 can be covered with a bulb covering 14 to achieve an appearance similar to the lights in a typical string of Christmas tree lights. This bulb covering 14 may be any desired shape and may be clear or colored plastic or glass. Different types of bulb coverings 14 can be used on a single tree, if desired. Generally, all clear plastic bulb-shaped coverings or randomly-colored plastic bulb-shaped coverings are preferred. The covering 14 can be held in place with a conventional adhesive 13. If the bulb covering 14 is plastic, it could even be melted directly onto the fiber optic strand 12, which may produce other interesting lighting effects.

Thus, one skill in the art will see that the internally illuminated artificial Christmas tree of the present invention provides a realistic-looking Christmas tree that is safe and relatively easy for the consumer to assemble. A number of specifics are provided in the description and drawings of the invention (e.g., number of tiers of branches, the number of branches in each tier, length of branches, number of lights, and the like). For example, the height of the tree, the number of branches, and the number of lights per branch can all be varied over considerably ranges. Additionally, the light coverings can be in varied colors, uniformly colorless, or patterned if desired. Still other variations are possible. Accordingly, the scope of the invention should be determined by the appended claims, not by the specific embodiments illustrated. These specifics are intended to illustrate the invention and not to limit it.

That which is claimed is:

1. An artificial tree incorporating an integral lighting system, said artificial tree comprising:
   (1) a main trunk having a top end, a bottom end, a substantially hollow passageway extending substantially along its length, a plurality of branch-attachment openings disposed along its length, and a plurality of light-source openings along its length;
   (2) a base attached to the bottom end of the main trunk to hold the main trunk in an upright position;
   (3) a plurality of light sources for insertion into the light-source openings in the main trunk;
   (4) a plurality of branches for attachment to the main trunk at the branch attachment openings in the main trunk, wherein each branch has a substantially hollow passageway extending at least partially along its length, needles disposed along its length, and optic-fiber openings disposed along its length, and wherein the branches form a tree-like shape when attached to the main trunk; and
   (5) a plurality of fiber optic strands for each branch, wherein each fiber optic strand has a light-gathering end and a light-dispersing end, wherein the light-gathering ends of the fiber optic strands for each branch are formed into a single bundle in the hollow passageway of the branch at the end of the branch which attaches to the main trunk, wherein the single bundle of light-gathering ends for each branch is illuminated with at least one of the light sources contained in the main trunk, and wherein the light-dispersing ends of the fiber optic strands for each branch pass through the optic-fiber openings and are dispersed throughout the needles of the branch.

2. An artificial tree as defined in claim 1, wherein the branches attached to the main trunk are formed into tiers, wherein one light source provides illumination for each tier of branches, wherein each light source consists of a low-voltage halogen lamp in a carriage assembly, wherein the carriage assembly is insertable into, and removable from, the light-source openings in the main trunk, wherein a convex lens covers the light-gathering ends of the fiber optic strands in each branch, wherein the light-dispersing ends of the fiber optic strands in the branches are enclosed in a clear or colored bulb covering, wherein the substantially hollow passageway of the main trunk has a light reflective surface, and wherein the main truck further contains a cooling fan and cooling vents for cooling the light sources therein.

3. An artificial tree as defined in claim 1, wherein a secondary trunk structure is attached to the top of the main trunk, said secondary trunk structure comprising
   (1) a secondary trunk having a top end, a bottom end, a substantially hollow passageway extending substantially along its length, a plurality of needles attached along its length to form a generally conical shape, and a plurality of optic-fiber openings located along its length, wherein the bottom end of the secondary trunk is adapted to attach to the top end of the main trunk; and
   (2) an additional plurality of fiber optic strands, each fiber optic strand in the additional plurality having a light-gathering end and a light-dispersing end, wherein the fiber optic strands in the additional plurality pass through the optic-fiber openings in the secondary trunk and down the passageway in the secondary trunk toward the bottom end of the secondary trunk, wherein the light-gathering ends of the additional plurality of fiber optic strands are formed into a single bundle near the bottom end of the secondary trunk in order to gather light from the upper-most light source in the main trunk, and wherein the light-dispersing ends of the additional plurality of fiber optic strands are dispersed throughout the needles attached to the secondary trunk;
   whereby the secondary trunk structure, when attached to the main trunk, and the plurality of branches, when attached to the main trunk, form the tree-like shape.

4. An artificial tree as defined in claim 3, wherein the branches attached to the main trunk are formed into tiers and wherein one light source provides illumination for each tier of branches.

5. An artificial tree as defined in claim 3, wherein each light source consists of a low-voltage halogen lamp in a carriage assembly and wherein the carriage assembly is insertable into, and removable from, the light-source openings in the main trunk.

6. An artificial tree as defined in claim 3, wherein a convex lens covers the light-gathering ends of the fiber optic strands in each branch and wherein the light-dispersing ends of the fiber optic strands in the branches and the secondary trunk structure are enclosed in a clear or colored bulb covering.

7. An artificial tree as defined in claim 3, wherein the substantially hollow passageway of the main trunk has a light reflective surface and wherein the main truck further contains a cooling fan and cooling vents for cooling the light sources therein.

8. An artificial tree as defined in claim 3, wherein the branches attached to the main trunk are formed into tiers, wherein one light source provides illumination for each tier of branches, wherein each light source consists of a low-voltage halogen lamp in a carriage assembly, wherein the carriage assembly is insertable into, and removable from, the light-source openings in the main trunk, wherein a convex lens covers the light-gathering ends of the fiber optic strands in each branch, wherein the light-dispersing ends of the fiber optic strands in the branches and the secondary trunk structure are enclosed in a clear or colored bulb covering, wherein the substantially hollow passageway of the main trunk has a light reflective surface, and wherein the main truck further contains a cooling fan and cooling vents for cooling the light sources therein.

9. An artificial Christmas tree comprising a hollow main trunk having disposed therein a plurality of light sources; a plurality of branches attached to the main trunk wherein each branch has a passageway therein for passage of fiber optical strands, a plurality of outlet holes arranged along the length of the branch, and a plurality of needles attached along the length of the branch; a plurality of fiber optical strands for each branch wherein each fiber optic strand has a light-gathering end and a light-dispersing end; and a secondary trunk structure attached to the top of the main trunk;
   wherein, for each branch, the fiber optic strands are located within the passageway such that the light-gatherings ends of the fiber optic strands can gather light from one of the light sources in the main trunk and the light-dispersing ends of fiber optic strands extend from the passageway in the branch through the outlet holes and are dispersed throughout the needles attached to the branch; and
   wherein said secondary trunk structure has
   (1) a secondary trunk having a substantially hollow passageway extending substantially along its length, a plurality of needles attached along its length to form a generally conical shape, and a plurality of optic-fiber openings located along its length, wherein the bottom of the secondary trunk is adapted to attach to the top of the main trunk; and
   (2) an additional plurality of fiber optic strands, each fiber optic strand of the additional plurality having a light-gathering end and a light-dispersing end, wherein the fiber optic strands pass through the optic-fiber openings in the secondary trunk and down the passageway in the secondary trunk toward the bottom end of the secondary trunk, wherein the light-gathering ends of the additional plurality of fiber optic strands are formed into a single bundle near the bottom of the secondary trunk in order to gather light from the upper-most light source in the main trunk, and wherein the light-dispersing ends of the additional plurality of fiber optic strands are dispersed throughout the needles attached to the secondary trunk;
   whereby the secondary trunk structure and the plurality of branches attached to the main trunk form a Christmas tree-like shape.

10. An artificial Christmas tree as defined in claim 9, wherein the plurality of branches are formed into tiers and wherein one light source provides illumination for each tier.

11. An artificial Christmas tree as defined in claim 10, wherein each light source consists of a low-voltage halogen lamp in a carriage assembly and wherein each carriage assembly is insertable into, and easily removable from, the main trunk.

12. An artificial Christmas tree as defined in claim 11, wherein a convex lens covers the light-gathering ends of the fiber optic strands in each branch and wherein the light-dispersing ends of the fiber optic strands in the branches and the secondary trunk structure are enclosed in clear or colored bulb coverings.

13. An artificial Christmas tree as defined in claim 12, wherein the interior of the hollow main trunk has a light reflective surface and wherein the hollow main truck further contains a cooling fan and cooling vents for cooling the light sources therein.

14. An artificial Christmas tree as defined in claim 9, wherein a convex lens covers the light-gathering ends of the fiber optic strands in each branch and wherein the light-dispersing ends of the fiber optic strands in the branches and the secondary trunk structure are enclosed in clear or colored bulb coverings.

15. An artificial Christmas tree as defined in claim 9, wherein the interior of the hollow main trunk has a light reflective surface and wherein the hollow main truck further contains a cooling fan and cooling vents for cooling the light sources therein.

16. An artificial Christmas tree as defined in claim 9, wherein the interior of the hollow main trunk has a light reflective surface and wherein the hollow main truck further contains a cooling fan and cooling vents for cooling the light sources therein.

17. An artificial Christmas tree as defined in claim 9, wherein each light source consists of a low-voltage halogen lamp in a carriage assembly and wherein each carriage assembly is insertable into, and easily removable from, the main trunk.

\* \* \* \* \*